United States Patent
Jo et al.

(10) Patent No.: US 11,871,173 B2
(45) Date of Patent: Jan. 9, 2024

(54) METHOD AND APPARATUS FOR CONTROLLING CONNECTION OF WIRELESS AUDIO OUTPUT DEVICE

(71) Applicant: Samsung Electronics Co., Ltd., Suwon-si (KR)

(72) Inventors: Nammin Jo, Suwon-si (KR); Seungnyun Kim, Suwon-si (KR); Minjung Park, Suwon-si (KR); Juyoung Yu, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 17/492,402

(22) Filed: Oct. 1, 2021

(65) Prior Publication Data

US 2022/0124425 A1 Apr. 21, 2022

Related U.S. Application Data

(63) Continuation of application No. PCT/KR2021/012569, filed on Sep. 15, 2021.

(30) Foreign Application Priority Data

Oct. 16, 2020 (KR) .................. 10-2020-0134476

(51) Int. Cl.
*H04R 1/10* (2006.01)
*H04W 76/10* (2018.01)
(Continued)

(52) U.S. Cl.
CPC ............ *H04R 1/1041* (2013.01); *G06F 3/14* (2013.01); *H04R 29/001* (2013.01); *H04W 76/10* (2018.02); *H04R 2420/07* (2013.01)

(58) Field of Classification Search
CPC .... H04R 2420/07; H04R 3/00; H04R 1/1041; H04R 29/001; H04R 1/1091; H04R 5/04;
(Continued)

(56) References Cited

U.S. PATENT DOCUMENTS 11,595,762 B2 * 2/2023 Goldstein ............ H04R 25/305
11,652,510 B2 * 5/2023 Carrigan .................. H04R 1/10
381/74

(Continued)

FOREIGN PATENT DOCUMENTS

KR 20090053141 A 5/2009
KR 20110014999 A 2/2011
(Continued)

OTHER PUBLICATIONS

International Search Report and Written Opinion of the International Searching Authority in connection with International Application No. PCT/KR2021/012569, dated Dec. 16, 2021, 11 pages.
(Continued)

Primary Examiner — Lun-See Lao

(57) ABSTRACT

Various embodiments of the disclosure provide a method and a device, the device including: a communication module; a memory; and a processor operatively coupled to the communication module and the memory, wherein the processor is configured to: monitor a first device latency between a wireless audio output device and the electronic device connected using a first communication scheme through the communication module; predict a second device latency in connection with the wireless audio output device via a wearable display device connected using a second communication scheme through the communication module; and control connection of the wireless audio output device based on the first device latency and the second device latency. Various embodiments are possible.

15 Claims, 11 Drawing Sheets

(51) Int. Cl.
*G06F 3/14* (2006.01)
*H04R 29/00* (2006.01)

(58) Field of Classification Search
CPC ....... H04W 76/10; H04W 4/18; H04W 40/12; H04W 84/22; H04L 1/0006; H04L 1/0014; H04L 1/0023; H04L 41/147; H04L 41/5019; H04L 43/0811; H04L 43/0829; H04L 43/0847; H04L 45/306; H04L 45/70; H04L 67/04; H04L 69/321; H04L 67/565; G16H 50/20; G16H 50/30; G16H 50/70; H04N 21/436; H04N 21/4363; H04N 21/439; H04N 21/43615; H04N 21/43637; H04N 21/4392; H04B 1/3827; H04B 1/385; H04B 2001/3872
USPC .............................. 381/56–59, 1–3; 700/94
See application file for complete search history.

(56) References Cited

U.S. PATENT DOCUMENTS

| | | | |
|---|---|---|---|
| 2009/0135856 A1 | 5/2009 | Gha et al. | |
| 2009/0274326 A1 | 11/2009 | Jia et al. | |
| 2009/0298420 A1 | 12/2009 | Haartsen et al. | |
| 2013/0330053 A1 | 12/2013 | Lee et al. | |
| 2014/0177864 A1* | 6/2014 | Kidron | H04N 21/439 381/80 |
| 2014/0335844 A1 | 11/2014 | Kang et al. | |
| 2015/0078596 A1* | 3/2015 | Sprogis | H04S 7/302 381/303 |
| 2015/0208161 A1 | 7/2015 | Lesaffre | |
| 2016/0255302 A1* | 9/2016 | Greene | H04N 21/44227 381/74 |
| 2018/0124719 A1* | 5/2018 | Kim | H04L 65/80 |
| 2018/0359561 A1* | 12/2018 | Lau | H04S 7/301 |
| 2019/0215349 A1 | 7/2019 | Adams et al. | |

FOREIGN PATENT DOCUMENTS

| | | |
|---|---|---|
| KR | 10-1178252 B1 | 8/2012 |
| KR | 20130137923 A | 12/2013 |
| KR | 10-2014-0132106 A | 11/2014 |
| KR | 20170076527 A | 7/2017 |
| KR | 10-2018-0046766 A | 5/2018 |
| KR | 20180126133 A | 11/2018 |

OTHER PUBLICATIONS

Supplementary European Search Report dated Nov. 8, 2023, in connection with European Patent Application No. 21880331.0, 9 pages.

* cited by examiner

METHOD AND APPARATUS FOR CONTROLLING CONNECTION OF WIRELESS AUDIO OUTPUT DEVICE

CROSS-REFERENCE TO RELATED APPLICATIONS

This application is a continuation of International Application No. PCT/KR2021/012569 filed on Sep. 15, 2021, which claims priority to Korean Patent Application No. 10-2020-0134476 filed on Oct. 16, 2020, the disclosures of which are herein incorporated by reference in their entirety.

BACKGROUND

1. Field

Various embodiments of the disclosure relate to a method and an apparatus for controlling a wireless audio output device so as to be connected to an electronic device or a wearable display device.

2. Description of Related Art

Development of digital technologies has been followed by widespread use of various types of electronic devices such as mobile communication terminals, personal digital assistants (PDA), electronic wallets, tablet personal computers, or wearable devices. In order to support and enhance the functionality of such electronic devices, hardware parts and/or software parts of electronic devices are continuously improved.

For example, an electronic device may connect to a laptop computer, an earphone (or headphone), or a screen output device by using short-range wireless communication (for example, Bluetooth) and may output or exchange information (or contents). For example, an electronic device may connect to an earphone through short-range communication and may output music or video sound through the earphone. A screen output device may include a wearable display device (for example, AR glasses, smart glasses, or head-mounted device (for example, a head-mounted display (HMD))). An electronic device may connect to a screen output device and may output, through the screen output device, various contents to which an extended reality (XR) technology (for example, virtual reality (VR), augmented reality (AR), and/or mixed reality (MR)) is applied. For example, a screen output device may overlap (or overlay) various digital contents (for example, virtual images) onto the real world and may provide a single image accordingly.

When an earbud and a screen output device are connected to an electronic device, a low level of sensitivity between the electronic device and the earbud may increase the latency of the earbud or may result in audio interruption. An increased latency of the earbud may cause desynchronization between audio data output through the earbud and video data output to the electronic device or the screen output device, thereby inconveniencing the user.

Various embodiments may provide an electronic device and a method for determining whether to connect a wireless audio output device to the electronic device or to connect the same to a wearable display device, based on a first latency between the electronic device and the wireless audio output device or a second latency between the electronic device, the wearable display device, and the wireless audio output device.

SUMMARY

An electronic device according to various embodiments of the disclosure may include: a communication module; a memory; and a processor operatively coupled to the communication module and the memory, wherein the processor is configured to: monitor a first device latency between a wireless audio output device and the electronic device connected using a first communication scheme through the communication module; predict a second device latency in connection with the wireless audio output device via a wearable display device connected using a second communication scheme through the communication module; and control connection of the wireless audio output device based on the first device latency and the second device latency.

A method for operating an electronic device according to various embodiments of the disclosure may include: monitoring a first device latency between the electronic device and a wireless audio output device connected using a first communication scheme through a communication module of the electronic device; predicting a second device latency in connection with the wireless audio output device via a wearable display device connected using a second communication scheme through the communication module; and controlling connection of the wireless audio output device based on the first device latency and the second device latency.

An electronic device according to various embodiments of the disclosure may include: a communication module; a display; a memory; and a processor operatively coupled to the communication module, the display, and the memory, wherein the processor is configured to: receive video data from an external electronic device connected using a second communication scheme through the communication module; display the received video data through the display; and when receiving, from the external electronic device, an indication that connection with the wireless audio output device is to be established, establish a connection to the wireless audio output device using a first communication scheme through the communication module, receive audio data and video data from the external electronic device, transmit the audio data to the wireless audio output device, and display the received video data through the display.

According to various embodiments, an electronic device may control connection of a wireless audio output device based on at least one of a first device latency between the electronic device and the wireless audio output device, a second device latency between the electronic device, a wearable display device, and the wireless audio output device, the state of the electronic device, the type of an application, or the type of the wireless audio output device, thereby improving the performance during an audio output through the wireless audio output device.

According to various embodiments, the first device latency between the electronic device and the wireless audio output device may be monitored, and the electronic device may check the second device latency between the electronic device, the wearable display device, and the wireless audio output device. If the first device latency is larger than the second device latency, the wireless audio output device connected to the electronic device may be controlled to be connected to the wearable display device, thereby reducing the latency of the wireless audio output device.

According to various embodiments, if an external device is connected to the electronic device through a first communication scheme while the electronic device and the wireless audio output device remain connected through the first communication scheme, the wireless audio output device may be controlled to be connected to the wearable display device, thereby preventing audio interruption.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
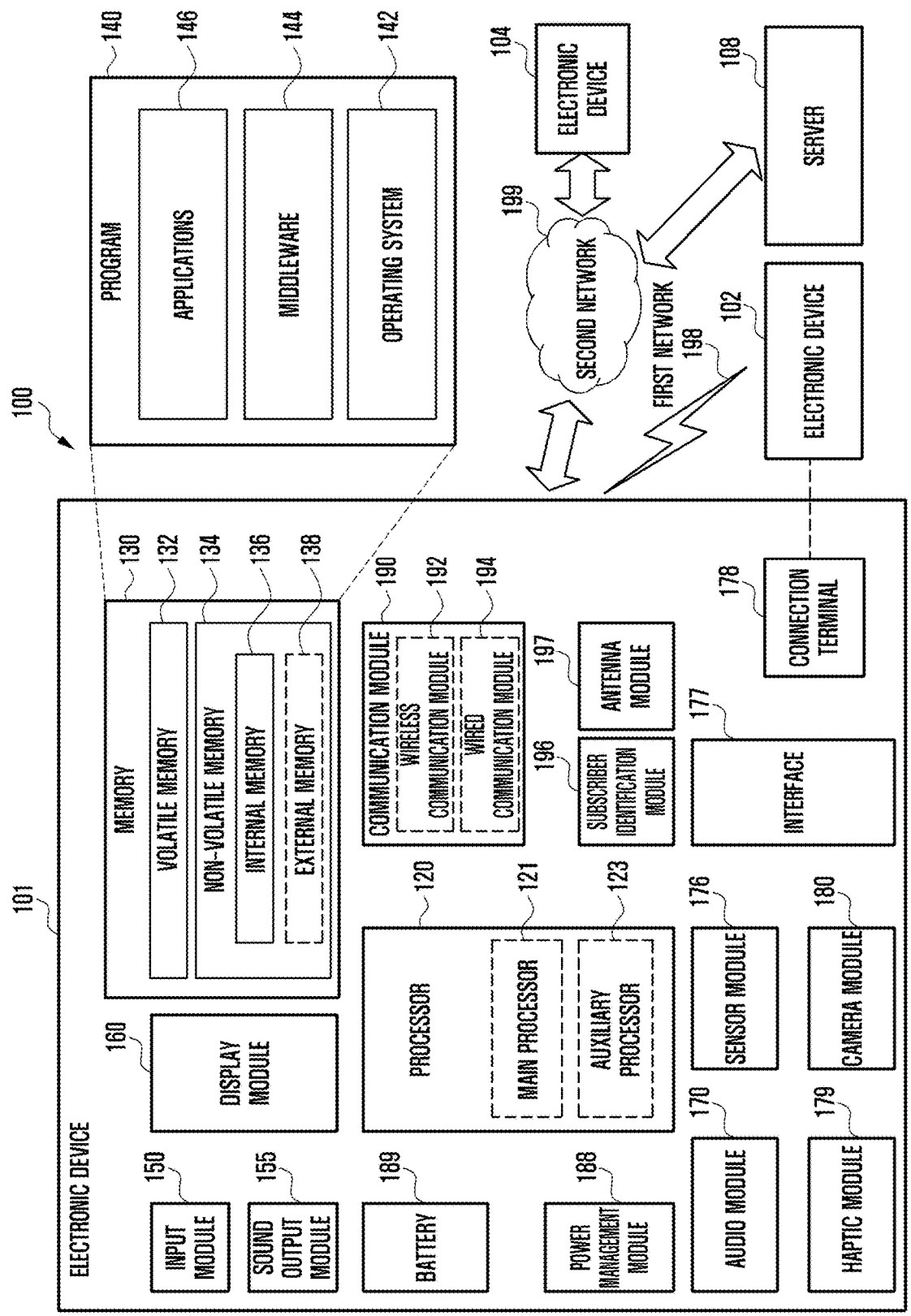
FIG. 1 is a block diagram of an electronic device in a network environment according to various embodiments.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1module 150, a sound output 1module 155, a display 1module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input 1module 150 may receive a command or data to be used by another component (e.g., the processor 120) of the electronic device 101, from the outside (e.g., a user) of the electronic device 101. The input 1module 150 may include, for example, a microphone, a mouse, a keyboard, a key (e.g., a button), or a digital pen (e.g., a stylus pen).

The sound output 1module 155 may output sound signals to the outside of the electronic device 101. The sound output 1module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1module 160 may visually provide information to the outside (e.g., a user) of the electronic device 101. The display 1module 160 may include, for example, a display, a hologram device, or a projector and control circuitry to control a corresponding one of the display, hologram device, and projector. According to an embodiment, the display 1module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1module 150, or output the sound via the sound output 1module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
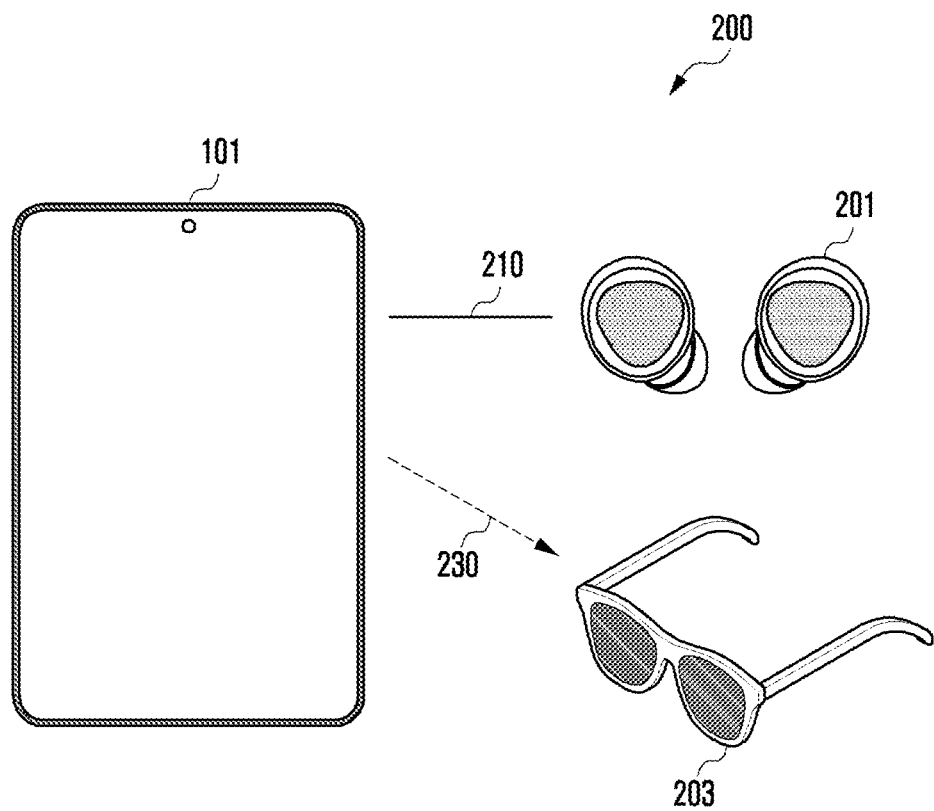
FIGS. 2A to 2C illustrate a network environment between an electronic device, a wireless audio output device, and a wearable display device according to various embodiments.
Figure 2B:
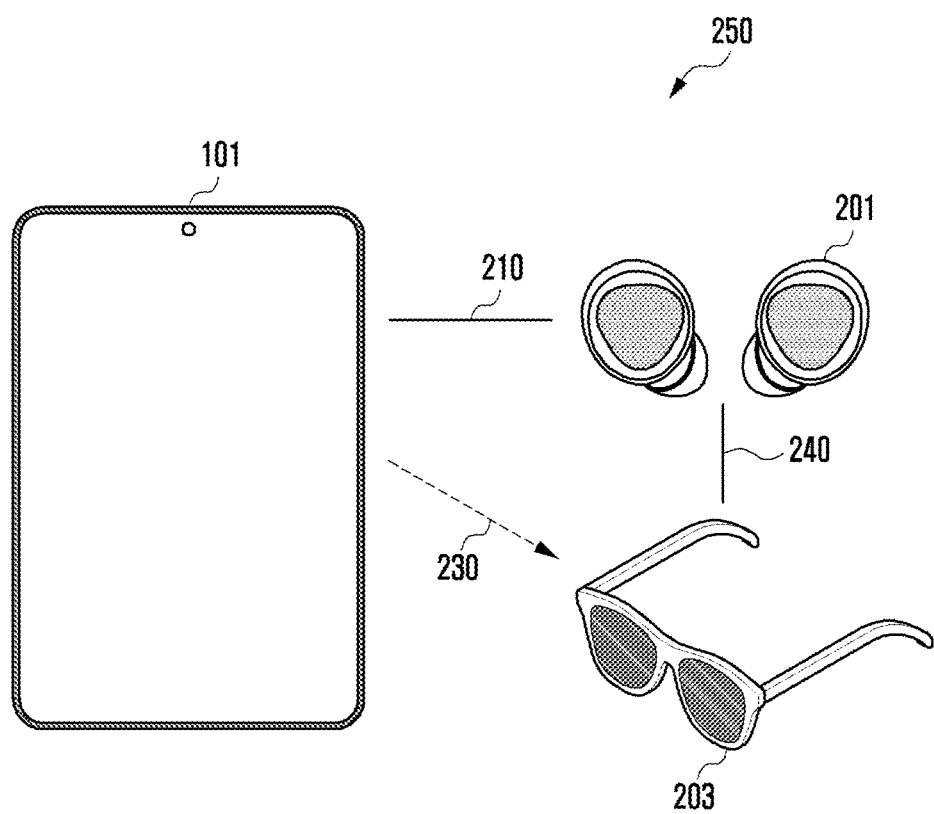
Figure 2C:
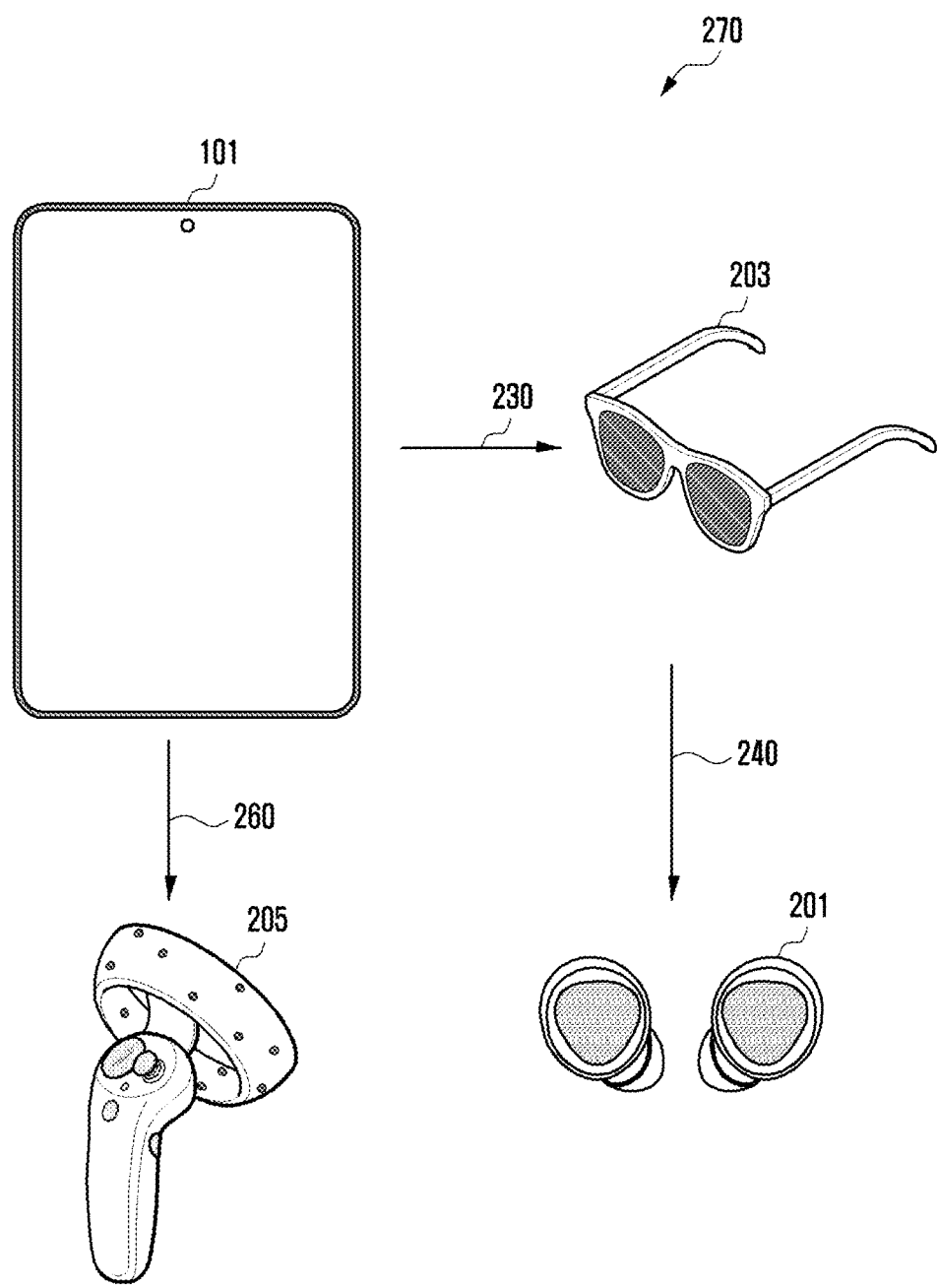

FIGS. 2A to 2C illustrate a network environment among an electronic device, a wireless audio output device, and a wearable display device according to various embodiments.

FIG. 2A illustrates a first network environment 200 (e.g., the first network environment 198 of FIG. 1) in which an electronic device is connected to a wireless audio output device and a wearable display device, respectively, according to various embodiments.

Referring to FIG. 2A, in a first network environment 200, an electronic device (e.g., the electronic device 101 of FIG. 1) according to various embodiments may be connected (e.g., paired) to a wireless audio output device 201 through a first communication scheme 210, and may be connected (e.g., paired) to a wearable display device 203 through a second communication scheme 230. The first communication scheme 210 and the second communication scheme 230 may be different communication schemes used for short-range wireless communication (e.g., the first network 198 of FIG. 1). For example, the first communication scheme 210 may be Bluetooth communication, and the second communication scheme 230 may be Wi-Fi communication. However, the disclosure is not limited by the examples.

The wireless audio output device 201 (or an ear wearable device) is a device that is connected to the electronic device 101 through the first communication scheme 210 to output audio data, and may include, for example, earbuds, earphones, or a headset. The wearable display device 203 (or a screen output device) is a device that is connected to the electronic device 101 through the second communication scheme 230 to output video data, and may include, for example, a wearable glass device (e.g., AR glasses, smart glasses), or a head mounted device (e.g., head mounted display (HMD)). The electronic device 101 may transmit audio data to the wireless audio output device 201 through the first communication scheme 210 and output the audio data through the wireless audio output device 201. The electronic device 101 may transmit video data to the wearable display device 203 through the second communication scheme 230 and output the video data through the wearable display device 203.

According to various embodiments, a latency of the wireless audio output device 201 may be determined by a buffer size configured in the wireless audio output device 201. The configuration of the buffer size may be changeable according to an operation mode of the wireless audio output device 201. For example, when the wireless audio output device 201 is in a first operation mode (e.g., a normal mode), the buffer size of the wireless audio output device 201 may be about 300 ms. When the wireless audio output device 201 is in a second operation mode (e.g., a game mode), the buffer size of the wireless audio output device 201 may be about 80 ms. The smaller the buffer size of the wireless audio output device 201, the lower the latency of the wireless audio output device 201. As another example, the buffer size may be fixed according to the type of the wireless audio output device 201.

In an embodiment, when the buffer size of the wireless audio output device 201 is adjustable, the buffer size of the wireless audio output device 201 may be changed according to the communication state of the first communication scheme 210. For example, when the communication strength of the first communication scheme 210 is weak, the buffer size of the wireless audio output device 201 may increase. For example, when a distance between the electronic device 101 and the wireless audio output device 203 increases, the communication strength of the first communication scheme 210 may be weakened. Here, the buffer size of the wireless audio output device 201 may increase.

For example, the first device latency between the wireless audio output device 201 and the electronic device 101 may include a first latency L1 according to the first communication scheme 210 and a latency of the wireless audio output device 201 (e.g., a second latency L2). In an embodiment, the first device latency (L1+L2) may be determined according to the first latency L1 and second latency L2. The first latency L1 may be smaller than the second latency L2, for example. For example, when the sensitivity between the wireless audio output device 201 and the electronic device 101 is not good (or the sensitivity is decreased), the electronic device 101 may increase the second latency L2 to prevent audio interruption. However, if the second latency L2 is increased, the first device latency (L1+L2) may increase. The first device latency may also be referred to as direct latency indicating a latency of a direct connection of the electronic device 101 and the wireless audio output device 203. The second device latency may also be referred to as indirect latency indicating a latency of an indirect connection of the electronic device 101 and the wireless audio output device 203.

According to various embodiments, when the second latency L2 is increased, audio data output through the wireless audio output device 201 may not be synchronized with video data output through the wearable display device 203. The electronic device 101 may monitor the first device latency (L1+L2) to control the wireless audio output device 201 to be connected to the wearable display device 203. For example, if the first device latency (L1+L2) exceeds a threshold (e.g., a switching reference value), the electronic device 101 may control the wireless audio output device 201 to be connected to the wearable display device 203. For example, the threshold may be determined by predicting the second device latency among the electronic device 101, the wireless audio output device 201, and the wearable display device 203 when the wireless audio output device 201 is connected to the wearable display device 203.

According to various embodiments, the electronic device 101 may control connection of the wireless audio output device 201 based on the state of the electronic device 101 or the type of the wireless audio output device 201 in the first network environment 200. For example, when the wireless audio output device 201 has the fixed buffer size, the electronic device 101 may maintain (or fix) the connection between the electronic device 101 and the wireless audio output device 201. When a new external device is connected to the electronic device 101, the electronic device 101 may switch connection of the wireless audio output device 201 to the wearable display device 203. For example, the electronic device 101 may communicate with the wireless audio output device 201 through the wearable display device 203.

FIG. 2B illustrates a second network environment 250 (e.g., the first network environment 198 of FIG. 1) in which an electronic device is connected to a wearable display device and a wireless audio output device is connected to the wearable display device according to various embodiments.

Referring to FIG. 2B, if the first device latency (L1+L2) exceeds a threshold, the electronic device 101 may control the wireless audio output device 201 to be connected to the wearable display device 203. In the second network environment 250, the electronic device 101 may be connected to the wearable display device 203 through the second communication scheme 230, and the wireless audio output device 201 may be connected to the wearable display device 203 through the third communication scheme 240. For example, the third communication scheme 240 may be the same as the first communication scheme 210. When the wireless audio output device 201 is connected to the wearable display device 203, the electronic device 101 may transmit audio data and video data to the wearable display device 203. The wearable display device 203 may receive audio data and video data from the electronic device 101, may transmit the received audio data to the wireless audio output device 201, and may output the received video data through the third communication scheme 240.

According to various embodiments, the second device latency among the electronic device 101, the wireless audio output device 201, and the wearable display device 203 may include: a third latency L3 according to the second communication scheme 230; a latency (e.g., a fourth latency L4) of the wearable display device 203 based on the buffer size of the wearable display device 203; a fifth latency L5 between the wearable display device 203 and the wireless audio output device 201 according to the third communication scheme 240; and the latency (e.g., a sixth latency L6) of the wireless audio output device 201. The second latency L2 and sixth latency L6 may denote the latency of the wireless audio output device 201.

The wireless audio output device 201 and the wearable display device 203 are devices worn by a user. The wireless audio output device 201 may be worn on the user's ears and the wearable display device 203 can be worn on the user's eyes or head. Since the distance (or spacing) between the user's ears and eyes is fixed, the distance between the wireless audio output device 201 and the wearable display device 203 may be substantially fixed. In an embodiment, since the distance between the wireless audio output device 201 and the wearable display device 203 is fixed, the sixth latency L6 may be configured to be smaller than the second latency L2. The third latency L3, fourth latency L4, fifth latency L5, and/or sixth latency L6 may be changed. In an embodiment, the third latency L3 or fifth latency L5 may be smaller than the fourth latency L4 or sixth latency L6.

According to various embodiments, the electronic device 101 may monitor the second device latency (L3+L4+L5+L6) to control connection of the wireless audio output device 201. For example, the electronic device 101 may predict (or calculate) the first device latency (L1+L2) based on the second device latency (L3+L4+L5+L6). In an embodiment, when the second device latency (L3+L4+L5+L6) exceeds the first device latency (L1+L2), the electronic device 101 may control the wireless audio output device 201 to be connected to the electronic device 101. Since the distance between the wireless audio output device 201 and the wearable display device 203 is substantially fixed, the sixth latency L6 may be configured to be smaller than the second latency L2. The first latency L1 and the third latency L3 may be smaller than second latency L2 or sixth latency L6. In an embodiment, the electronic device 101 may predict the second latency L2, and may monitor the fourth latency L4 to the sixth latency L6 to switch (or change) connection of the wireless audio output device 201.

According to various embodiments, the electronic device 101 may switch (or change) connection of the wireless audio output device 201 based on at least one of whether or not content is output through the wearable display device 203, whether or not an external device is connected to the wearable display device 203, or a movement of the user in a second network environment 250. For example, when there is no content output through the wearable display device 203, the electronic device 101 may end a connection between the wearable display device 203 and the wireless audio output device 201, and may be connected to the wireless audio output device 201. For example, not outputting content through the wearable display device 203 denotes that execution of an application, by which content is output through the wearable display device 203 according to a request of the user, is ended or the power of the wearable display device 203 is turned off.

In an embodiment, the wearable display device 203 may not output content when detecting that the user is not wearing the wearable display device 203. A user not wearing the wearable display device 203 denotes that a distance between the wearable display device 203 and the wireless audio output device 201 may change according to the movement of the user. The wearable display device 203 may transmit, to the electronic device 101, an indication relating to whether a user is wearing the wearable display device. When receiving an indication relating to a user not wearing the wearable display device 203 or a distance between the wearable display device 203 and the wireless audio output device 201 is changed, the electronic device 101 may end a connection between the wearable display device 203 and the wireless audio output device 201, and may be connected to the wireless audio output device 201. As another example, when an external device is connected to the wearable display device 203, the electronic device 101 may end a connection between the wearable display device 203 and the wireless audio output device 201, and may be connected to the wireless audio output device 201.

According to various embodiments, when not outputting content through the wearable display device 203 in the second network environment 250, or when an external device is connected to the wearable display device 203, the electronic device 101 may perform switching (or changing) to the first network environment 200.

FIG. 2C illustrates a third network environment 270 (e.g., the first network environment 198 of FIG. 1) in which a wearable display device and an external device are connected to an electronic device, and a wireless audio output device is connected to the wearable display device according to various embodiments.

Referring to FIG. 2C, in the third network environment 270, the electronic device 101 and the wearable display device 203 are connected through the second communication scheme 230, the electronic device 101 and the external device 205 are connected through the fourth communication scheme 260, and the wearable display device 203 and the wireless audio output device 201 are connected through the third communication scheme 240. The third communication scheme 240 and the fourth communication scheme 260 may be the same communication scheme (e.g., the first communication scheme 210). When the wireless audio output device 201 is connected to the wearable display device 203, the electronic device 101 may transmit audio data and video data to the wearable display device 203. The wearable display device 203 may receive audio data and video data from the electronic device 101, may transmit the received audio data to the wireless audio output device 201 through the third communication scheme 240, and may output the received video data.

According to various embodiments, when the external device 205 is connected to the electronic device 101 in the first network environment 200, the electronic device 101 may perform switching (or changing) to the third network environment 270. Connection of two different devices to the electronic device 101 using the same communication scheme (e.g., the first communication scheme 210 and the fourth communication scheme 260) may affect the first device latency (L1+L2) between the electronic device 101 and the wireless audio output device 201. For example, when two different devices are connected to the electronic device 101 using the same communication scheme (e.g., the first communication scheme 210 and the fourth communication scheme 260), the first device latency (L1+L2) between the electronic device 101 and the wireless audio output device 201 may increase. The electronic device 101 may control connection of the wireless audio output device 201 based on the state of the electronic device 101 (e.g., the external device 205 is connected thereto).

An electronic device (e.g., the electronic device 101 of FIG. 1) according to various embodiments may include a communication module (e.g., the communication module 190 of FIG. 1), a memory (e.g., the memory 130 of FIG. 1), and a processor (e.g., the processor 120 of FIG. 1) operatively coupled to the communication module and the memory, wherein the processor is configured to: monitor a first device latency between a wireless audio output device (e.g., the wireless audio output device 201 of FIGS. 2A to 2C) and the electronic device, which are connected using a first communication scheme (e.g., the first communication scheme 210 of FIGS. 2A and 2B) through the communication module; predict a second device latency in connection with the wireless audio output device via a wearable display device (e.g., the wearable display device 203 of FIGS. 2A to 2C) connected using a second communication scheme (e.g., the second communication scheme 230 of FIGS. 2A to 2C) through the communication module; and control connection of the wireless audio output device based on the first device latency and the second device latency.

The processor may be configured to: maintain the connection between the wireless audio output device and the electronic device when the first device latency is equal to or less than the second device latency; and control the wireless audio output device to be connected to the wearable display device when the first device latency exceeds the second device latency.

The first device latency may include at least one of a first latency between the electronic device and the wireless audio output device according to the first communication scheme and a second latency based on a buffer size of the wireless audio output device.

The second device latency may include at least one of a third latency between the electronic device and the wearable display device according to the second communication scheme, a fourth latency based on a buffer size of the wearable display device, a fifth latency between the wearable display device and the wireless audio output device, or a sixth latency based on a buffer size of the wireless audio output device.

The processor may be configured to control connection of the wireless audio output device based on a state of the electronic device or a type of the wireless audio output device in a first network environment in which the electronic device and the wireless audio output device are connected and the electronic device and the wearable display device are connected.

The processor may be configured to control the wireless audio output device to be connected to the wearable display device when an external device is connected to the electronic device through the first communication scheme.

The processor may be configured to: maintain a connection between the wireless audio output device and the electronic device when the wireless audio output device has a fixed buffer size based on the type of the wireless audio output device; and control connection of the wireless audio output device based on the first device latency and the second device latency when the wireless audio output device has a variable buffer size based on the type of the wireless audio output device.

The processor may be configured to switch connection of the wireless audio output device based on at least one of whether or not content is output through the wearable display device, whether or not an external device is connected to the wearable display device, or a movement of the user in a second network environment in which the electronic device and the wearable display device are connected and the wearable display device and the wireless audio output device are connected.

The processor may be configured to, when there is no content output through the wearable display device, end the connection between the wearable display device and the wireless audio output device, and control the wireless audio output device to be connected to the electronic device.

The processor may be configured to, when an external device is connected to the wearable display device, end the connection between the wearable display device and the wireless audio output device, and control the wireless audio output device to be connected to the electronic device.

The processor may be configured to, when the distance between the wearable display device and the wireless audio output device is changed according to the movement of the user, end the connection between the wearable display device and the wireless audio output device, and control the wireless audio output device to be connected to the electronic device.

An electronic device (e.g., the electronic device 101 of FIG. 1) according to various embodiments may include a communication module (e.g., the communication module 190 of FIG. 1), a display (e.g., the display module 160 of FIG. 1), a memory (e.g., the memory 130 of FIG. 1), and a processor (e.g., the processor 120 of FIG. 1) operatively coupled to the communication module, the display, and the memory, wherein the processor is configured to: receive video data from an external electronic device connected using a second communication scheme (e.g., the second communication scheme 230 of FIGS. 2A to 2C) through the communication module; display the received video data through the display; and when receiving, from the external electronic device, an indication that connection with the wireless audio output device is to be established, establish a connection to the wireless audio output device using a first communication scheme (e.g., the first communication scheme 210 of FIGS. 2A and 2B) through the communication module, receive audio data and video data from the external electronic device, transmit the audio data to the wireless audio output device, and display the received video data through the display.

Figure 3:
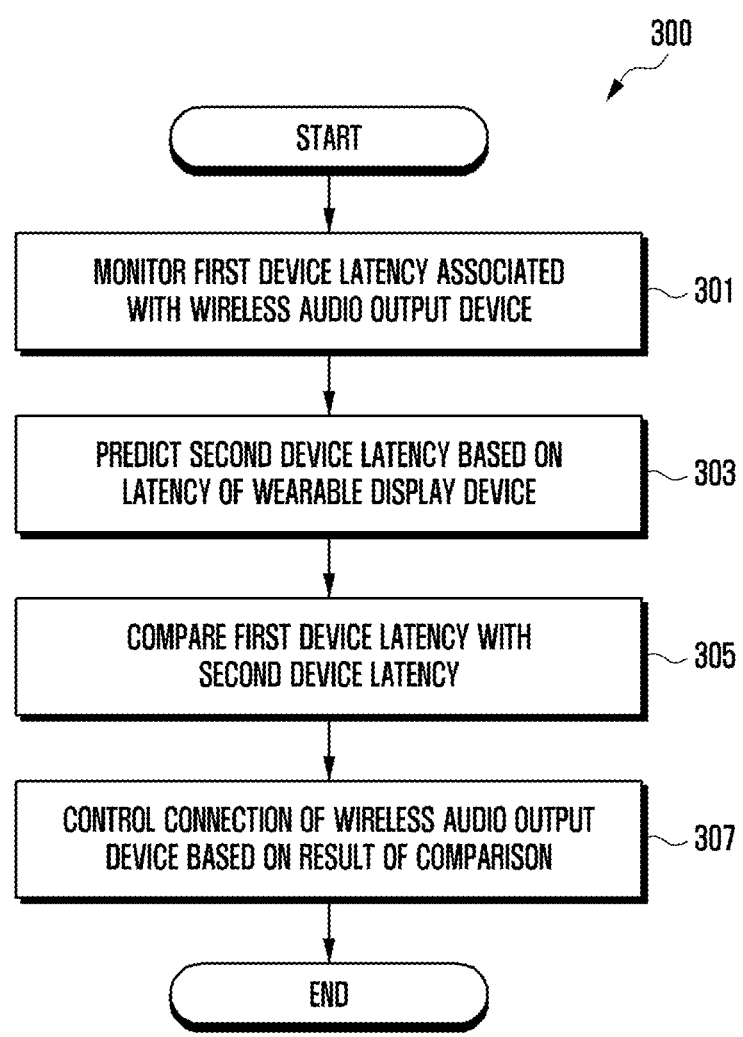
FIG. 3 is a flowchart illustrating a method for operating an electronic device according to various embodiments.

FIG. 3 is a flowchart 300 illustrating a method for operating an electronic device according to various embodiments.

Referring to FIG. 3, in operation 301, a processor (e.g., the processor 120 of FIG. 1) of an electronic device (e.g., the electronic device 101 of FIG. 1) according to various embodiments may monitor a first device latency associated with a wireless audio output device (e.g., the wireless audio output device 201 of FIGS. 2A to 2C). When operation 301 is performed, the electronic device 101 may be in a first network environment (e.g., the first network environment 200 of FIG. 2A). In the first network environment 200, the electronic device 101 may be connected to the wireless audio output device 201 through a first communication scheme (e.g., the first communication scheme 210 of FIG. 2A), and may be connected to a wearable display device (e.g., the wearable display device 203 of FIGS. 2A to 2C) through a second communication scheme (e.g., the second communication scheme 230 of FIG. 2A).

In an embodiment, the first communication scheme 210 and the second communication scheme 230 may be different communication schemes used for short-range wireless communication (e.g., the first network 198 of FIG. 1). For example, the first communication scheme 210 may be Bluetooth communication, and the second communication scheme 230 may be Wi-Fi communication. A first device latency associated with the wireless audio output device 201 may denote a latency between the wireless audio output device 201 and the electronic device 101. For example, the first device latency (L1+L2) may include a first latency L1 according to the first communication scheme (e.g., the first communication scheme 210 of FIG. 2A) and a latency (e.g., a second latency L2) of the wireless audio output device 201. The first latency L1 may be smaller than the second latency L2, and the first device latency (L1+L2) may be determined according to the second latency L2. The first latency and the second latency may also be referred to as the first direct latency and the second direct latency.

In operation 303, the processor 120 may predict the second device latency based on a latency of the wearable display device 203. The second device latency may denote latency among the electronic device 101, the wireless audio output device 201, and the wearable display device 203. For example, the second device latency (L3+L4+L5+L6) may include: a third latency L3 according to the second communication scheme 230; a latency (e.g., a fourth latency L4) of the wearable display device 203 based on the buffer size of the wearable display device 203; a fifth latency L5 between the wearable display device 203 and the wireless audio output device 201 according to the third communication scheme 240; and a latency (e.g., a sixth latency L6) of the wireless audio output device 201. The second latency L2 and the sixth latency L6 may refer to the latency of the wireless audio output device 201. In an embodiment, since the distance between the wireless audio output device 201 and the wearable display device 203 is substantially fixed, the sixth latency L6 may be configured to be smaller than second latency L2. The third latency L3 and the fourth latency L4 to the sixth latency L6 may be changed. The processor 120 may predict the fourth latency L4 to the sixth latency L6 to calculate the second device latency (L3+L4+L5+L6). The third latency though the sixth latency may also be referred to as a first indirect latency through a fourth indirect latency.

In operation 305, the processor 120 may compare the first device latency with the second device latency. For example, the processor 120 may compare the first device latency (L1+L2) with the second device latency (L3+L4+L5+L6).

In operation 307, the processor 120 may control connection of the wireless audio output device 201 based on a result of the comparison. When the first device latency (L1+L2) is equal to or less than the second device latency (L3+L4+L5+L6), the processor 120 may maintain a connection between the electronic device 101 and the wireless audio output device 201. The processor 120 may switch connection of the wireless audio output device 201 if the first device latency (L1+L2) exceeds the second device latency (L3+L4+L5+L6). For example, switching connection of the wireless audio output device 201 may be performed such that the wireless audio output device 201 is controlled to be connected to the wearable display device 203 in a state where the first network environment 200 is changed to the second network environment 250.

In an embodiment, the processor 120 may transmit, to the wearable display device 203, a command (instruction) to connect with the wireless audio output device 201 through the second communication scheme 230, and may transmit, to the wireless audio output device 201, a command (instruction) to connect with the wearable display device 203 through the third communication scheme 240 or the first communication scheme 210. The third communication scheme 240 may be the same communication scheme as the first communication scheme 210. For example, the processor 120 may transmit device information of the wireless audio output device 201 to the wearable display device 203 to control the wearable display device 203 to be connected to the wireless audio output device 201. The device information of the wireless audio output device 201 may include, for example, at least one of a name, an identifier, a type, and connection information (e.g., MAC address). The processor 120 may end connection with the wireless audio output device 201 based on the connection (e.g., pairing) between the wearable display device 203 and the wireless audio output device 201.

According to various embodiments, the processor 120 may control connection of the wireless audio output device 201 based on the state of the electronic device 101 or the type of the wireless audio output device 201 in a state in which the electronic device 101 and the wireless audio output device 201 are connected. For example, when the wireless audio output device 201 has the fixed buffer size, the processor 120 may maintain (or fix) the connection between the electronic device 101 and the wireless audio output device 201. When the wireless audio output device 201 has the fixed buffer size, the second latency L2 may be the same as the sixth latency L6. In an embodiment, if the second latency L2 and the sixth latency L6 are the same, it is highly likely that the first latency L1 is equal to or less than the third latency L3 to the fifth latency L5, and thus the processor 120 may maintain (fix) the connection between the electronic device 101 and the wireless audio output device 201. In still another example, if the second latency L2 is the same as the sixth latency L6, and if the first latency L1 is equal to or greater than the third latency L3 to the fifth latency L5, the processor 120 may end the connection between the electronic device 101 and the wireless audio output device 201, and enable the wireless audio output device to be connected to the wearable display device 203.

According to various embodiments, when a new external device (e.g., the external device 205 of FIG. 2C) is connected to the electronic device 101, the processor 120 may switch connection of the wireless audio output device 201 to the wearable display device 203. For example, when both the wireless audio output device 201 and the external device 205 are connected to the electronic device 101 using the same communication scheme (e.g., the first communication scheme 210), the sensitivity between the wireless audio output device 201 and the electronic device 101 may decrease. In order to prevent a decrease in sensitivity between the wireless audio output device 201 and the electronic device 201, the second latency L2 needs to be increased, and thus the first device latency (L1+L2) may increase. In an embodiment, when the first device latency (L1+L2) increases, it is highly likely that the first device latency (L1+L2) exceeds the second device latency (L3+L4+L5+L6), and thus the processor 120 may switch connection of the wireless audio output device 201 to the wearable display device 203. As another example, when the first device latency (L1+L2) increases, the processor 120 identifies the first device latency (L1+L2) and the second device latency (L3+L4+L5+L6) and, if the first device latency (L1+L2) is less than the second device latency (L3+L4+L5+L6), the processor may maintain (or fix) the connection between the electronic device 101 and the wireless audio output device 201.

According to various embodiments, the processor 120 may switch (or change) connection of the wireless audio output device 201 based on at least one of whether or not content is output through the wearable display device 203, whether or not an external device is connected to the wearable display device 203, or a movement of the user, in a state in which the wearable display device 203 and the wireless audio output device 201 are connected. For example, when there is no content output through the wearable display device 203, the processor 120 may end connection between the wearable display device 203 and the wireless audio output device 201, and may establish a connection to the wireless audio output device 201. As another example, when an external device is connected to the wearable display device 203, the processor 120 may end the connection between the wearable display device 203 and the wireless audio output device 201, and may establish a connection to the wireless audio output device 201. As still another example, when the distance between the wearable display device 203 and the wireless audio output device 201 is changed according to the movement of the user, the processor 120 may end the connection between the wearable display device 203 and the wireless audio output device 201, and enable the wireless audio output device 201 to be connected to the electronic device 101.

Figure 4:
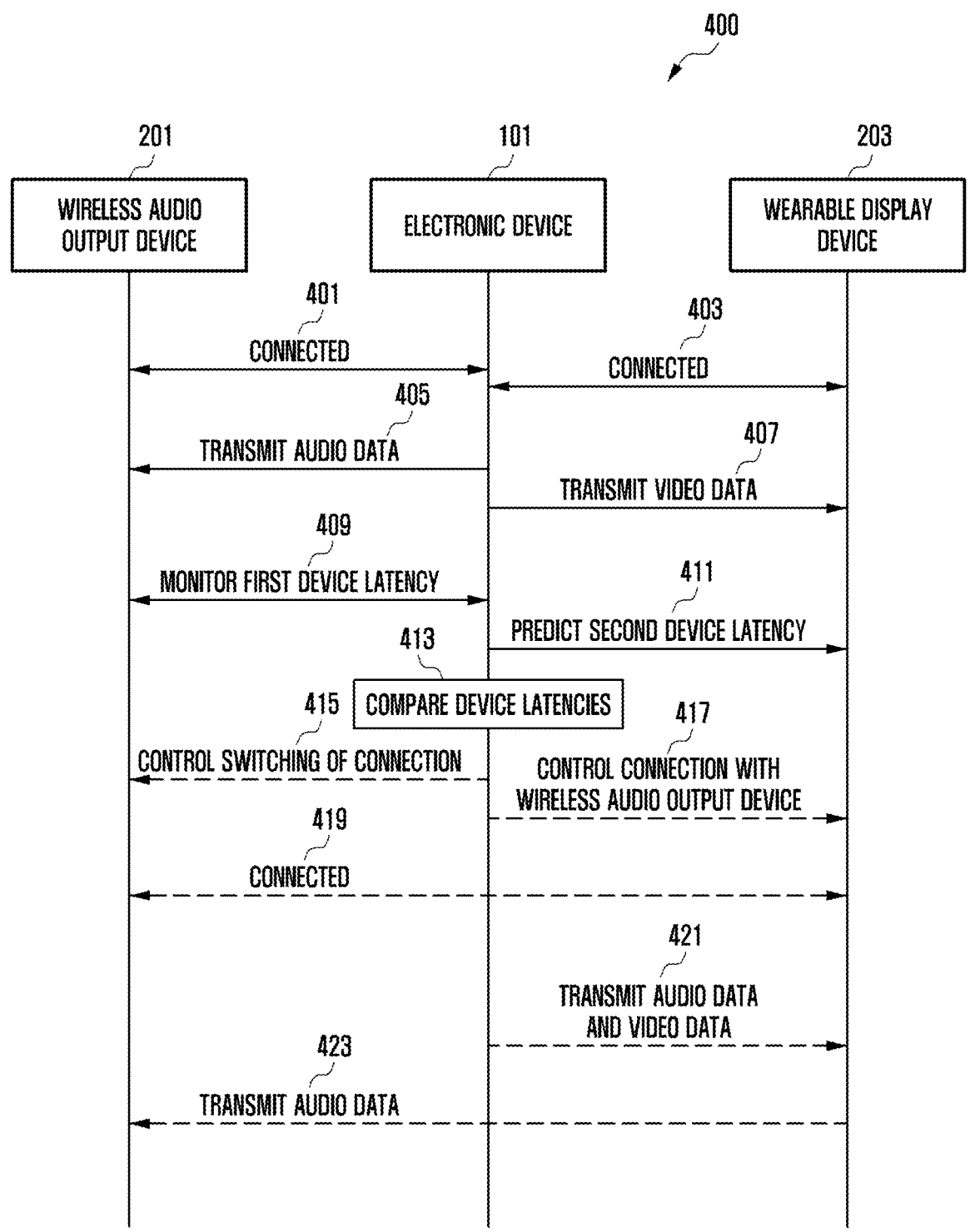
FIG. 4 illustrates a signal flow among an electronic device, a wireless audio output device, and a wearable display device according to various embodiments.

FIG. 4 illustrates a signal flow 400 among an electronic device, a wireless audio output device, and a wearable display device according to various embodiments.

Referring to FIG. 4, in operation 401, an electronic device (e.g., the electronic device 101 of FIG. 1) according to various embodiments may be connected to a wireless audio output device (e.g., the wireless audio output device 201 of FIGS. 2A to 2C). The electronic device 101 may be connected to the wireless audio output device 201 through a first communication scheme (e.g., the first communication scheme 210 of FIG. 2A). For example, the first communication scheme may include Bluetooth. The electronic device 101 may identify whether the wireless audio output device 201 has the fixed buffer size, based on the type of the wireless audio output device 201. According to various embodiments, when the wireless audio output device 201 has the fixed buffer size, the electronic device 101 may not perform operations 409 to 423 below.

In operation 403, the electronic device 101 may be connected to a wearable display device (e.g., the wearable display device 203 of FIGS. 2A to 2C). The electronic device 101 may be connected to the wearable display device 203 through a second communication scheme (e.g., the second communication scheme 230 of FIG. 2A). For example, the second communication scheme may include Wi-Fi.

In operation 405, the electronic device 101 may transmit audio data to the wireless audio output device 201. The electronic device 101 may transmit audio data to the wireless audio output device 201 according to a request of the user. For example, when a request for content (e.g., an application) output is transmitted through the wireless audio output device 201 and the wearable display device 203 based on a user input, the electronic device 101 may transmit audio data to the wireless audio output device 201. The wireless audio output device 201 may receive the audio data from the electronic device 101 and output the audio data through a speaker.

In operation 407, the electronic device 101 may transmit video data to the wearable display device 203. The electronic device 101 may transmit video data to the wearable display device 203 according to a request of the user. The wearable display device 203 may receive the video data from the electronic device 101 and display the video data through a display. When the electronic device 101 is connected to the wearable display device 203 and does not transmit the video data to the wearable display device 203, operation 407 may be omitted.

In operation 409, the electronic device 101 may monitor the first device latency. The first device latency may denote latency between the wireless audio output device 201 and the electronic device 101. The first device latency (L1+L2) may include a first device latency L1 according to the first communication scheme 210 and a latency of the wireless audio output device 201 (e.g., a second latency L2). The first device latency (L1+L2) may be determined according to the first latency L1 and the second latency L2. For example, since the first latency L1 is substantially fixed, the first device latency (L1+L2) may be determined according to the second latency L2. The second latency L2 may be changed according to, for example, the communication strength of the first communication scheme.

In operation 411, the electronic device 101 may predict a second device latency. The second device latency may denote a latency among the electronic device 101, the wireless audio output device 201, and the wearable display device 203. The second device latency (L3+L4+L5+L6) may include a third latency L3 according to the second communication scheme 230, a latency (e.g., a fourth latency L4) of the wearable display device 203 based on the buffer size of the wearable display device 203, a fifth latency L5 between the wearable display device 203 and the wireless audio output device 201 according to the third communication scheme 240, and a latency (e.g., a sixth latency L6) of the wireless audio output device 201.

The second latency L2 and the sixth latency L6 may refer to the latency of the wireless audio output device 201. Since the distance between the wireless audio output device 201 and the wearable display device 203 is substantially fixed, the sixth latency L6 may be a fixed value smaller than the second latency L2. For example, since the distance between the wireless audio output device 201 and the wearable display device 203 is smaller than the distance between the wireless audio output device 201 and the electronic device 101, and the distance between the wireless audio output device 201 and the wearable display device 203 is substantially fixed, the buffer size may be configured to be small. The third latency L3 to the sixth latency L6 may be changed. For example, since there is no substantial change in the third latency L3, the electronic device 101 may calculate the second device latency (L3+L4+L5+L6) by predicting the fourth latency L4 to the sixth latency L6.

Referring to FIG. 4, although it has been described that operation 401, operation 405, and/or operation 409 are first performed, and then operation 403, operation 407, and/or operation 411 are performed later, operations 401 to operation 411 may be performed simultaneously. Alternatively, operation 403, operation 407, and/or operation 411 may be performed first and operation 401, operation 405, and/or operation 409 may be performed later. It is merely an example for helping understanding of the disclosure, and the disclosure is not limited by the description.

Operations 401 to 411 may describe operations of the electronic device 101 in a first network environment (e.g., the first network environment 200 of FIG. 2A).

In operation 413, the electronic device 101 may compare the device latencies. For example, the electronic device 101 may compare the first device latency (L1+L2) with the second device latency (L3+L4+L5+L6). The electronic device 101 may control connection of the wireless audio output device 201 based on a result of the comparison. For example, when the first device latency (L1+L2) is equal to or less than the second device latency (L3+L4+L5+L6), the electronic device may maintain connection between the electronic device 101 and the wireless audio output device 201. If the electronic device 101 determines to maintain the connection between the electronic device 101 and the wireless audio output device 201, operation may return to operations 405 and 407. When the first device latency (L1+L2) is equal to or less than the second device latency (L3+L4+L5+L6), the electronic device 101 may not perform the following operations 415 to 423.

According to various embodiments, if the first device latency (L1+L2) exceeds the second device latency (L3+L4+L5+L6), the electronic device 101 may switch connection of the wireless audio output device 201. Hereinafter, operations 415 to 423 describe the operation of the electronic device 101, in which the first network environment 200 is switched (or changed) to the second network environment (e.g., the second network environment 250 of FIG. 2B).

In operation 415, the electronic device 101 may control switching of connection of the wireless audio output device 201. The electronic device 101 may transmit a command (instruction) to connect with the wearable display device 203 to the wireless audio output device 201 through the first communication scheme 210 or the third communication scheme 240. The electronic device 101 may end the connection with the wireless audio output device 201 based on the connection of the wireless audio output device 201 with the wearable display device 203.

In operation 417, the electronic device 101 may control the wearable display device 203 to be connected to the wireless audio output device 201. The electronic device 101 may transmit a command (instruction) to connect with the wireless audio output device 201 to the wearable display device 203 through the second communication scheme 230. For example, the electronic device 101 may transmit device information of the wireless audio output device 201 to the wearable display device 203 to control the wearable display device 203 to be connected to the wireless audio output device 201. The device information of the wireless audio output device 201 may include, for example, at least one of a name, an identifier, a type, and connection information (e.g., MAC address).

In operation 419, the wireless audio output device 201 and the wearable display device 203 may be connected (e.g., paired). An operation, in which the wireless audio output device 201 and the wearable display device 203 are connected through a third communication scheme (e.g., the third communication scheme 240 of FIG. 2B), corresponds to the prior art, and thus a detailed description thereof will be omitted. The third communication scheme 240 may be the same as the first communication scheme 210.

In operation 421, the electronic device 101 may transmit audio data and/or video data to the wearable display device 203. For example, the audio data may be output through the wireless audio output device 201, and the video data may be output through the wearable display device 203. The wearable display device 203 may receive audio data and/or video data from the electronic device 101. As another example, if operation 407 is omitted, in operation 421, the electronic device 101 may not transmit video data to the wearable display device 203. In operation 423, the wearable display device 203 may transmit the received audio data to the wireless audio output device 201 through the third communication scheme 240. In an embodiment, the wearable display device 203 may display the received video data on a display. As another example, the wearable display device 203 may not display the received video data on the display.

According to various embodiments, as the distance between the wireless audio output device 201 and the electronic device 101 becomes greater, the sensitivity of the first communication scheme 210 decreases, and if sound interruption occurs even if buffering of the wireless audio output device 201 is increased, the audio data of the electronic device 101 may be transmitted to the wireless audio output device 201 through the second communication scheme 230 between the electronic device 101 and the wearable display device 203 and the third communication scheme 240 between the wearable display device 203 and the wireless audio output device 201.

Figure 5:
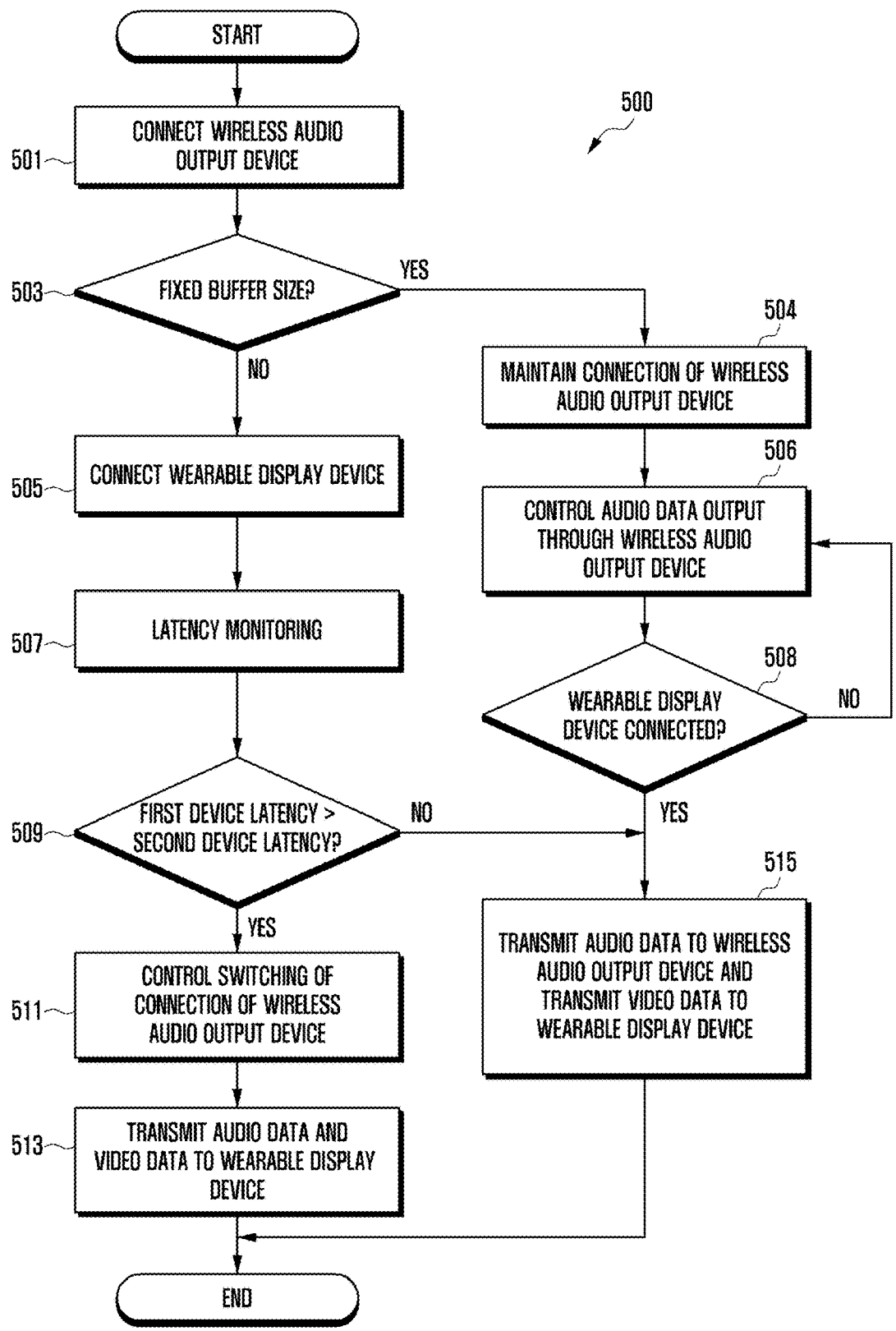
FIG. 5 is a flowchart illustrating a method for switching connection of a wireless audio output device to a wearable display device in an electronic device according to various embodiments.

FIG. 5 is a flowchart 500 illustrating a method for switching connection of a wireless audio output device to a wearable display device in an electronic device according to various embodiments.

Referring to FIG. 5, in operation 501, the processor (e.g., the processor 120 of FIG. 1) of the electronic device (e.g., the electronic device 101 of FIG. 1) according to various embodiments may be connected to a wireless audio output device (e.g., the wireless audio output device 201 of FIGS. 2A to 2C). The processor 120 may be connected to the wireless audio output device 201 through a communication module (e.g., the communication module 190 of FIG. 1) by using a first communication scheme (e.g., the first communication scheme 210 of FIG. 2A). The first communication scheme 210 is short-range wireless communication (e.g., the first network 198 of FIG. 1), for example, Bluetooth communication.

In operation 503, the processor 120 may determine whether the wireless audio output device 201 has a fixed buffer size. The processor 120 may identify whether the wireless audio output device 201 has the fixed buffer size based on the type of the wireless audio output device 201. The wireless audio output device 201 may be at least one of a fixed or a variable type. When a connection to the wireless audio output device 201 is established, the processor 120 may identify the type through device information of the wireless audio output device. When the wireless audio output device 201 is a 'fixed' type, the wireless audio output device 201 may have a fixed buffer size, and when the wireless audio output device 201 is a 'variable' type, the wireless audio output device 201 may have a variable buffer size. The processor 120 performs operation 504 when the wireless audio output device 201 has a 'fixed' buffer size, and performs operation 505 when the wireless audio output device 201 has a 'variable' buffer size.

When the wireless audio output device 201 has a 'fixed' buffer size, in operation 504, the processor 120 may maintain connection of the wireless audio output device 201. Maintaining the connection of the wireless audio output device 201 may denote fixing the connection between the wireless audio output device 201 and the electronic device 101 without switching the connection of the wireless audio output device 201. The processor 120 may perform operation 504 and then perform operation 506.

In operation 506, the processor 120 may control audio data output through the wireless audio output device 201. For example, when a request for audio data output through the wireless audio output device 201 is transmitted based on a user input, the processor 120 may transmit audio data to the wireless audio output device 201. The wireless audio output device 201 may receive the audio data from the electronic device 101 and output the audio data through a speaker.

In operation 508, the processor 120 may determine whether a connection to a wearable display device (e.g., the wearable display device 203 of FIGS. 2A to 2C) is established. If a connection to the wearable display device 203 is established, the processor 120 may perform operation 515, and if a connection to the wearable display device 203 is not established, the processor 120 may return to operation 506.

If the wireless audio output device 201 has a 'variable' buffer size, in operation 505, the processor 120 may be connected to the wearable display device (e.g., the wearable display device 203 of FIGS. 2A to 2C) through a second communication scheme (e.g., the second communication scheme 230 of FIG. 2A). The second communication scheme 230 is a type of the first network 198 and is different from the first communication scheme 210, and the second communication scheme 230 may be Wi-Fi communication for example. In an embodiment, if the electronic device 101 and the wearable display device 203 are connected through the second communication scheme, operation 505 may be omitted.

In operation 507, the processor 120 may monitor a latency. The latency may include the first device latency (L1+L2) between the wireless audio output device 201 and the electronic device 101, and the second device latency (L3+L4+L5+L6) among the electronic device 101, the wireless audio output device 201, and the wearable display device 203. The first device latency (L1+L2) may include the first latency L1 according to the first communication scheme (e.g., the first communication scheme 210 of FIG. 2A) and the latency of the wireless audio output device 201 (e.g., the second latency L2). The second device latency (L3+L4+L5+L6) may denote a latency among the electronic device 101, the wireless audio output device 201, and the wearable display device 203. The second device latency (L3+L4+L5+L6) may include the third latency L3 according to the second communication scheme 230, a latency (e.g., the fourth latency L4) of a glass device 203 based on the buffer size of the wearable display device 203, the fifth latency L5 between the wearable display device 203 and the wireless audio output device 201 according to the third communication scheme 240, and a latency (e.g., the sixth latency L6) of the wireless audio output device 201.

In operation 509, the processor 120 may compare the first device latency with the second device latency. For example, the processor 120 may compare the first device latency (L1+L2) with the second device latency (L3+L4+L5+L6). If the first device latency (L1+L2) exceeds the second device latency (L3+L4+L5+L6), the processor 120 performs operation 511, if the first device latency (L1+L2) is equal to or less than the second device latency (L3+L4+L5+L6), the processor 120 may perform operation 515.

If the first device latency (L1+L2) exceeds the second device latency (L3+L4+L5+L6), in operation 511, the processor 120 may control switching connection of the wireless audio output device 201. The processor 120 may transmit a command (instruction) to connect with the wireless audio output device 201 to the wearable display device 203 through the second communication scheme 230, and may transmit a command (instruction) to connect with the wearable display device 203 to the wireless audio output device 201 through the first communication scheme 210 or the third communication scheme 240. The third communication scheme 240 may be, for example, the same as the first communication scheme 210. For example, the processor 120 may transmit device information of the wireless audio output device 201 to the wearable display device 203 so as to control the wearable display device 203 to be connected to the wireless audio output device 201. The device information of the wireless audio output device 201 may include, for example, at least one of a name, an identifier, a type, and connection information. The processor 120 may end the connection with the wireless audio output device 201 based on the connection (e.g., pairing) of the wearable display device 203 with the wireless audio output device 201.

In operation 513, the processor 120 may transmit audio data and/or video data to the wearable display device 203. The wearable display device 203 may receive audio data and/or video data from the electronic device 101. For example, the wearable display device 203 may transmit the received audio data to the wireless audio output device 201 and display the received video data on a display. The wireless audio output device 201 may receive the audio data from the wearable display device 203 and output the audio data through a speaker. In operation 513, the electronic device 101, the wireless audio output device 201, and the wearable display device 203 may be in a second network environment (e.g., the second network environment 250 of FIG. 2B).

If the first latency is equal to or less than the second latency, in operation 515, the processor 120 may transmit audio data to the wireless audio output device 201 and transmit video data to the wearable display device 203. If the first device latency is equal to or less than the second latency, the processor 120 may transmit audio data to the wireless audio output device 201 and transmit video data to the wearable display device 203. Alternatively, if the wireless audio output device 201 has a 'fixed' buffer size and the wearable display device 203 is connected thereto, the processor 120 may transmit audio data to the wireless audio output device 201 and transmit video data to the wearable display device 203. The wireless audio output device 201 may receive the audio data from the electronic device 101 and output the audio data through a speaker. The wearable display device 203 may receive video data from the electronic device 101 and display the video data on the display. In operation 515, the electronic device 101, the wireless audio output device 201, and the wearable display device 203 may be in a first network environment (e.g., the first network environment 200 of FIG. 2A).

Figure 6:
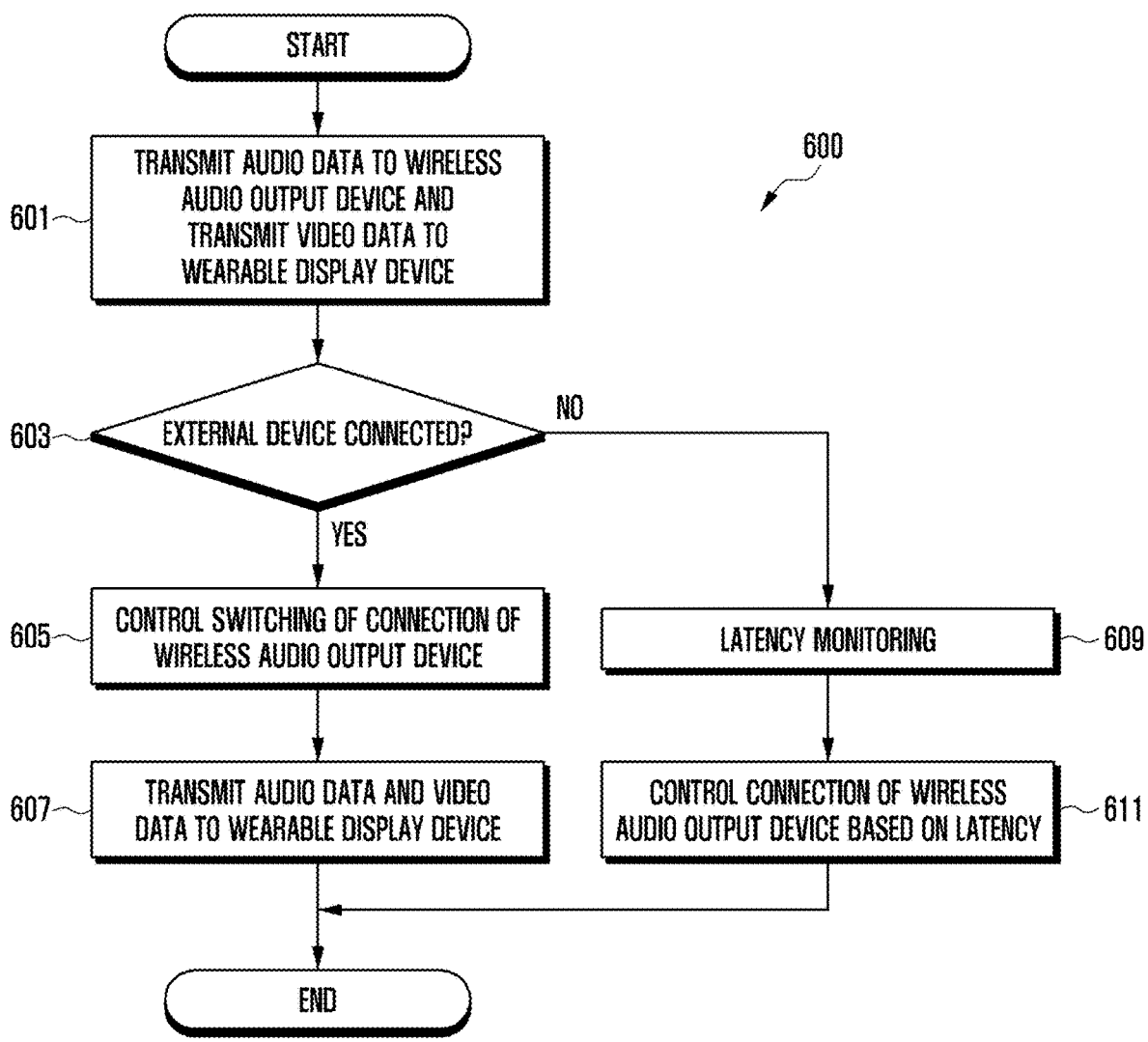
FIG. 6 is a flowchart illustrating a method for controlling connection of a wireless audio output device based on a state of an electronic device according to various embodiments.

FIG. 6 is a flowchart 600 illustrating a method for controlling connection of a wireless audio output device based on a state of an electronic device according to various embodiments.

Referring to FIG. 6, in operation 601, a processor (e.g., the processor 120 of FIG. 1) of an electronic device (e.g., the electronic device 101 of FIG. 1) according to various embodiments may transmit audio data to a wireless audio output device (e.g., the wireless audio output device 201 of FIGS. 2A to 2C), and may transmit video data to a wearable display device (e.g., the wearable display device 203 of FIGS. 2A to 2C). Since operation 601 is the same as or similar to operation 515, a detailed description thereof may be omitted. In operation 601, the electronic device 101, the wireless audio output device 201, and the wearable display device 203 may be in a first network environment (e.g., the first network environment 200 of FIG. 2A).

In operation 603, the processor 120 may determine whether or not an external device (e.g., the external device 205 of FIG. 2C) is connected. The external device 205 may be a device connected to the electronic device 101 through a first communication scheme (e.g., the first communication scheme 210 or the third communication scheme 240 of FIG. 2A). If the external device 205 is connected, the processor 120 may perform operation 605, and if the external device 205 is not connected, the processor 120 may perform operation 609.

When the external device 205 is connected, in operation 605, the processor 120 may control switching connection of the wireless audio output device 201. Switching connection of the wireless audio output device 201 may be performed such that the wireless audio output device 201 is controlled to be connected to the wearable display device 203 in a state where the first network environment 200 is changed to the second network environment 250. The processor 120 may transmit a command (instruction) to connect with the wireless audio output device 201 to the wearable display device 203 through the second communication scheme 230, and may transmit a command (instruction) to connect with the wearable display device 203 to the wireless audio output device 201 through the first communication scheme 210 or the third communication scheme 240. For example, the processor 120 may transmit device information of the wireless audio output device 201 to the wearable display device 203 so as to control the wearable display device 203 to be connected to the wireless audio output device 201. The device information of the wireless audio output device 201 may include, for example, at least one of a name, an identifier, a type, and connection information. The processor 120 may end the connection with the wireless audio output device 201 based on the connection (e.g., pairing) of the wearable display device 203 with the wireless audio output device 201.

In operation 607, the processor 120 may transmit audio data and/or video data to the wearable display device 203. The wearable display device 203 may receive audio data and/or video data from the electronic device 101. For example, the wearable display device 203 may transmit the received audio data to the wireless audio output device 201 and display the received video data on a display. The wireless audio output device 201 may receive the audio data from the wearable display device 203 and output the audio data through a speaker. In operation 607, the electronic device 101, the wireless audio output device 201, the wearable display device 203, and the external device 205 may be in a second network environment (e.g., the third network environment 270 of FIG. 2C).

When the external device 205 is not connected, in operation 609, the processor 120 may monitor a latency. The latency may include the first device latency between the wireless audio output device 201 and the electronic device 101, and the second device latency among the electronic device 101, the wireless audio output device 201, and the wearable display device 203. The first device latency (L1+L2) may include a first latency L1 according to the first communication scheme (e.g., the first communication scheme 210 of FIG. 2A) and a latency of the wireless audio output device 201 (e.g., a second latency L2). The second latency may denote a second device latency among the electronic device 101, the wireless audio output device 201, and the wearable display device 203. The second device latency (L3+L4+L5+L6) may include a third latency L3 according to the second communication scheme 230, a latency (e.g., a fourth latency L4) of a wearable display device 203 based on the buffer size of the wearable display device 203, a fifth latency L5 between the wearable display device 203 and the wireless audio output device 201 according to the third communication scheme 240, and a latency (e.g., the sixth latency L6) of the wireless audio output device 201.

In operation 611, the processor 120 may control connection of the wireless audio output device 201 based on the latency. Operation 611 may include operations 507 to 515 of FIG. 5. For example, the processor 120 may compare the first device latency (L1+L2) with the second device latency (L3+L4+L5+L6), and may control connection of the wireless audio output device 201 based on a result of the comparison. If the first device latency (L 1+L2) is equal to or less than the second device latency (L3+L4+L5+L6), the processor 120 may maintain connection between the electronic device 101 and the wireless audio output device 201. The processor 120 may switch connection of the wireless audio output device 201 if the first device latency (L1+L2) exceeds the second device latency (L3+L4+L5+L6). Switching connection of the wireless audio output device 201 may be performed such that the wireless audio output device 201 is controlled to be connected to the wearable display device 203 in a state where the first network environment 200 is changed to the second network environment 250.

Figure 7:
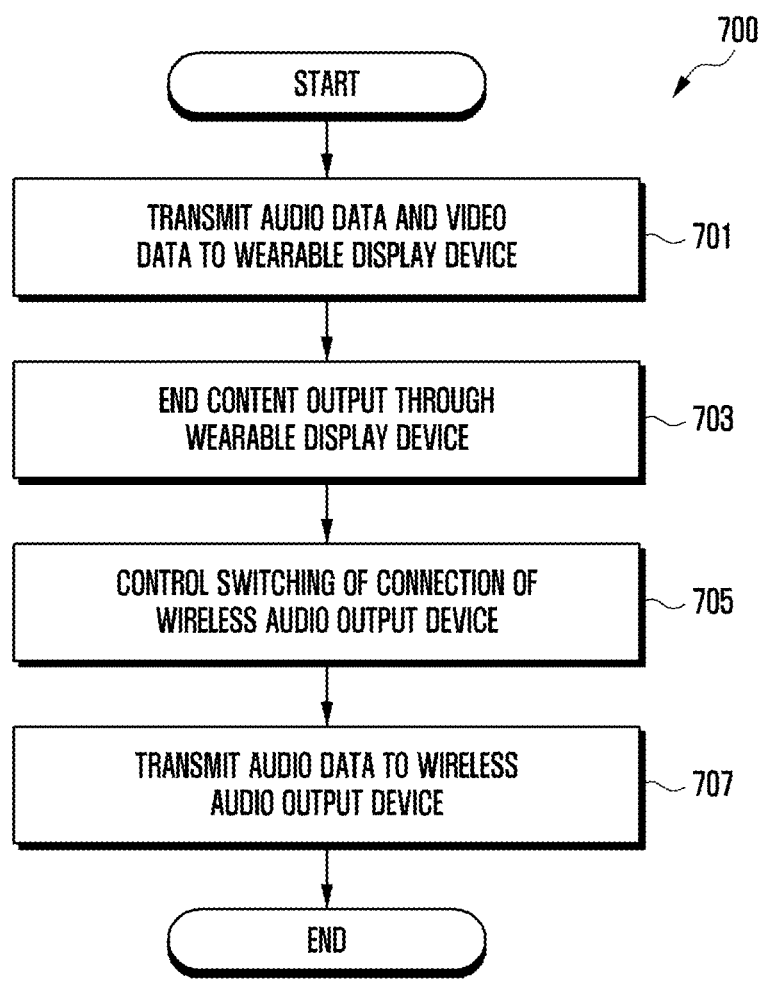
FIG. 7 is another flowchart illustrating a method for switching connection of a wireless audio output device to an electronic device in the electronic device according to various embodiments.

FIG. 7 is another flowchart 700 illustrating a method for switching connection of a wireless audio output device to an electronic device in the electronic device according to various embodiments.

Referring to FIG. 7, in operation 701, a processor (e.g., the processor 120 of FIG. 1) of an electronic device (e.g., the electronic device 101 of FIG. 1) according to various embodiments may transmit audio data and/or video data to a wearable display device (e.g., the wearable display device 203 of FIGS. 2A to 2C). The wearable display device 203 may receive audio data and/or video data from the electronic device 101. For example, the wearable display device 203 may transmit the received audio data to the wireless audio output device (e.g., the wireless audio output device 201 of FIGS. 2A to 2C) and display the received video data on a display. The wireless audio output device 201 may receive the audio data from the wearable display device 203 and output the audio data through a speaker. In operation 701, the electronic device 101, the wireless audio output device 201, and the wearable display device 203 may be in a second network environment (e.g., the second network environment 250 of FIG. 2B).

In operation 703, the processor 120 may detect that content output performed through the wearable display device 203 is ended. The ending of content output may be caused by a user input or determination on whether a user is wearing the wearable display device 203. For example, the processor 120 may receive, from the user, a request for ending content output performed through the wearable display device 203. As another example, the processor 120 may receive notification of the wearing state of the user from the wearable display device 203. The user not wearing the wearable display device 203 denotes that a distance between the wearable display device 203 and the wireless audio output device 201 changes according to a movement of the user. The wearable display device 203 may detect whether the user is wearing the wearable display device and notify the electronic device 101 of a wearing state of the user. If the wearable display device 203 detects that a user is not wearing the wearable display device 203, content output may not be performed. When receiving an indication relating to the user not wearing the wearable display device 203, the processor 120 may determine that content output is ended.

In operation 705, the processor 120 may control switching connection of the wireless audio output device 201. Switching connection of the wireless audio output device 201 may be performed such that the wireless audio output device 201 is controlled to be connected to the electronic device 101 in a state where the second network environment 250 is changed to the first network environment (e.g., the first network environment 200 of FIG. 2A). For example, the processor 120 may transmit a command (instruction) to release the connection with the wearable display device 203 to the wireless audio output device 201 through the first communication scheme 210, and to enable the wireless audio output device 201 to be connected to the electronic device 101. As another example, the processor 120 may maintain the connection of the wearable display device 203 with the wireless audio output device 201 through the first communication scheme 210, and enable the wireless audio output device 201 to be connected to the electronic device 101. For example, the processor 120 may perform control such that the connection of the wearable display device 203 with the wireless audio output device 201 is ended based on the connection with the electronic device 101. As another example, the processor 120 may transmit a command (instruction) to release the connection with the wireless audio output device 201 to the wearable display device 203 through the second communication scheme 230.

In operation 707, the processor 120 may perform control such that audio data is to be transmitted to the wireless audio output device 201. For example, when a request for outputting audio data through the wireless audio output device 201 is transmitted based on a user input, the processor 120 may transmit the audio data to the wireless audio output device 201. As another example, the processor 120 may perform control such that audio data is to be transmitted to the wireless audio output device 201 through the first communication scheme 210 based on the state of the wearable display device 203 even if there is no user input. The state of the wearable display device may include, for example, ending of content output. The wireless audio output device 201 may receive the audio data from the electronic device 101 and output the audio data through a speaker. In operation 707, the electronic device 101, the wireless audio output device 201, and the wearable display device 203 may be in a first network environment 200.

Figure 8:
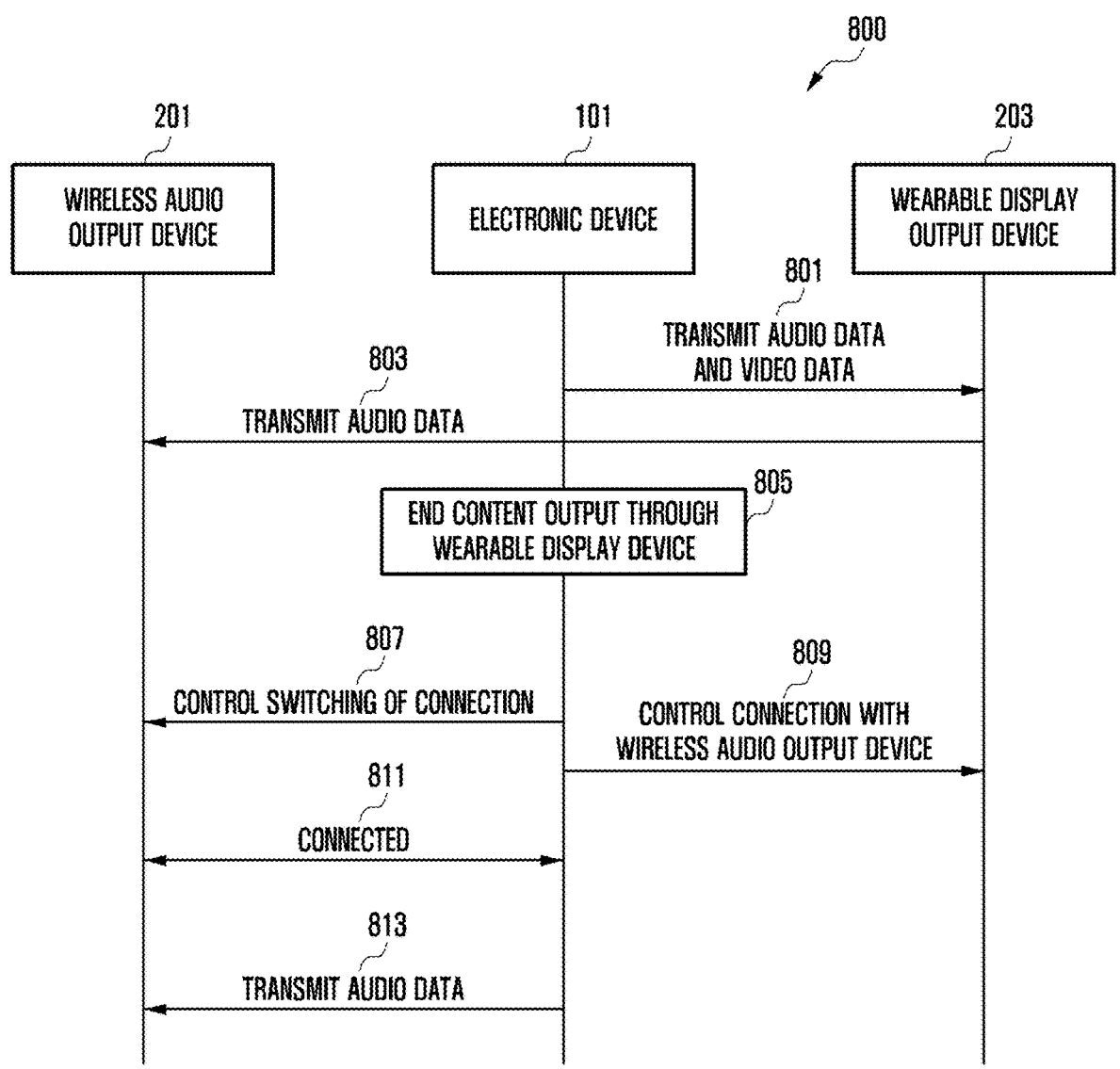
FIG. 8 is another diagram illustrating a signal flow among an electronic device, a wireless audio output device, and a wearable display device according to various embodiments.

FIG. 8 is another diagram illustrating a signal flow 800 among an electronic device, a wireless audio output device, and a wearable display device according to various embodiments.

Referring to FIG. 8, in operation 801, an electronic device (e.g., the electronic device 101 of FIG. 1) according to various embodiments may transmit audio data and/or video data to a wearable display device (e.g., the wearable display device 203 of FIGS. 2A to 2C). For example, the audio data may be output through a wireless audio output device (e.g., the wireless audio output device 201 of FIGS. 2A to 2C), and the video data may be output through the wearable display device 203. The wearable display device 203 may receive audio data and/or video data from the electronic device 101. In operation 801, the electronic device 101, the wireless audio output device 201, and the wearable display device 203 may be in a second network environment (e.g., the second network environment 250 of FIG. 2B).

In operation 803, the wearable display device 203 may transmit the received audio data to the wireless audio output device 201. The wearable display device 203 may display the received video data on a display.

In operation 805, the electronic device 101 may detect that content output performed through the wearable display device 203 is ended. For example, the ending of content output may be caused by a user input or determination on whether a user is wearing the wearable display device 203. For example, the electronic device 101 may receive, from the user, a request for ending content output performed through the wearable display device 203. Alternatively, if the electronic device 101 receives a notification that a user is not wearing the wearable display device 203, the electronic device 101 may determine that the content output is ended.

In operation 807, the electronic device 101 may control switching connection of the wireless audio output device 201. For example, the electronic device 101 may transmit, to the wireless audio output device 201, a command (instruction) to release the connection with the wearable display device 203 and enable the wireless audio output device 201 to be connected to the electronic device 101 through the first communication scheme 210.

In operation 809, the electronic device 101 may control the connection of the wearable display device 203 with the wireless audio output device 201. For example, the electronic device 101 may transmit a command (instruction) to release the connection with the wireless audio output device 201 to the wearable display device 203 through the second communication scheme 230.

In operation 811, the electronic device 101 may be connected to the wireless audio output device 201 through the first communication scheme 210. Based on the connection with the wireless audio output device 201, the electronic device 101 may perform control such that connection of the wearable display device 203 with the wireless audio output device 201 is ended. In operation 811, the electronic device 101, the wireless audio output device 201, and the wearable display device 203 may be in a first network environment 200.

In operation 813, the electronic device 101 may transmit audio data to the wireless audio output device 201. For example, when a request for outputting audio data through the wireless audio output device 201 is transmitted based on a user input, the electronic device 101 may transmit audio data to the wireless audio output device 201. The wireless audio output device 201 may receive the audio data from the electronic device 101 and output the audio data through a speaker.

Figure 9:
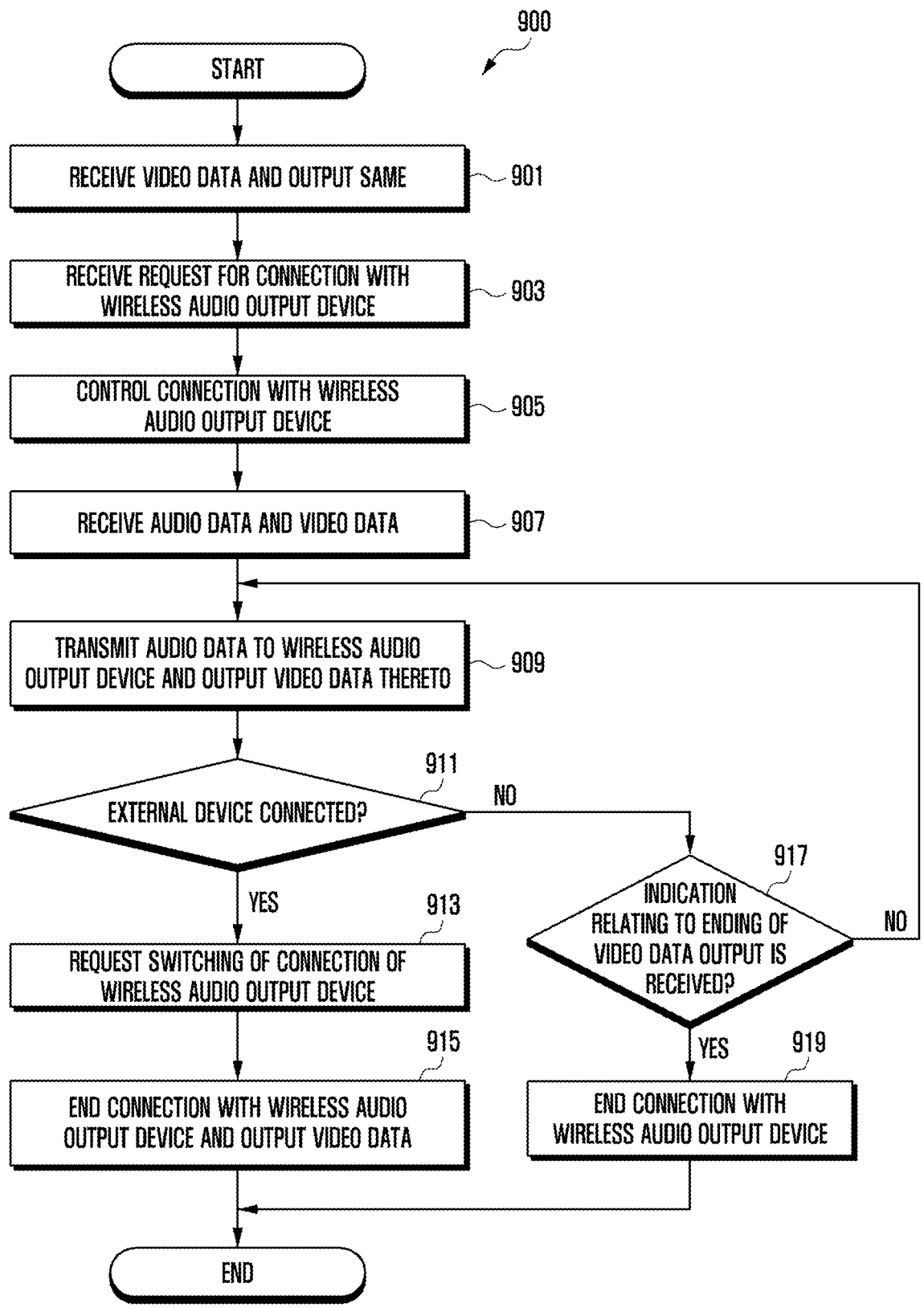
FIG. 9 is a flowchart illustrating a method for operating a wearable display device according to various embodiments.

FIG. 9 is a flowchart 900 illustrating a method for operating a wearable display device according to various embodiments.

Referring to FIG. 9, in operation 901, a wearable display device (e.g., the wearable display device 203 of FIGS. 2A to 2C) according to various embodiments may receive video data from an electronic device (e.g., the electronic device 101 of FIG. 1) and output the video data. The wearable display device may include a communication module (e.g., the communication module 190 of FIG. 1), a display (e.g., the display module 160 of FIG. 1), and a memory (e.g., the memory 130 of FIG. 1). The wearable display device 203 may receive the video data through a second communication scheme (e.g., the second communication scheme 230 of FIGS. 2A to 2C) and display the received video data through a display.

In operation 903, the wearable display device 203 may receive a request for connection with the wireless audio output device 201 from the electronic device 101. The request for connection with the wireless audio output device 201 may be based on a request of a user or latency. For example, if the first device latency (L1+L2) exceeds the second device latency (L3+L4+L5+L6), the electronic device 101 may transmit a request for connection with the wireless audio output device 201 to the wearable display device 203. As another example, the electronic device 101 may transmit a request for connection with the wearable display device 203 to the wireless audio output device 201.

In operation 905, the wearable display device 203 may control connection with the wireless audio output device 201. For example, the wearable display device 203 may receive device information of the wireless audio output device 201 from the electronic device 101, and may be connected to the wireless audio output device 201 based on device information of the wireless audio output device 201.

In operation 907, the wearable display device 203 may receive audio data and/or video data from the electronic device 101. For example, the audio data may be output through the wireless audio output device 201, and the video data may be output through the wearable display device 203.

In operation 909, the wearable display device 203 may transmit the received audio data to the wireless audio output device 201 and output the video data thereto. The wearable display device 203 may transmit the received audio data to the wireless audio output device 201 through a third communication scheme (e.g., the third communication scheme 240 of FIG. 2B). The wearable display device 203 may display the received video data on a display.

In operation 911, the wearable display device 203 may determine whether or not an external device (e.g., the external device 205 of FIG. 2C) is connected. The external device 205 may be a device connected to the wearable display device 203 through a fourth communication scheme (e.g., the fourth communication scheme 260 of FIG. 2C). The fourth communication scheme 260 may be the same short-distance communication scheme as the third communication scheme 240 connected to the wireless audio output device 201. The wearable display device 203 may perform operation 913 if the external device 205 is connected, and may perform operation 917 if the external device 205 is not connected.

If the external device 205 is connected, in operation 913, the wearable display device 203 may transmit a request for switching connection of the wireless audio output device 201 to the electronic device 101. The request for switching connection of the wireless audio output device 201 may denote requesting connection of the wireless audio output device 201 to the electronic device 101 in a state where the second network environment (e.g., the second network environment 250 of FIG. 2B) is changed to the first network environment 200. The wearable display device 203 may request that the wireless audio output device 201 is to be connected to the electronic device 101 through the second communication scheme 230, or may notify, through the third communication scheme 240, the wireless audio output device 201 that connection with the electronic device 101 is to be established.

In operation 915, the wearable display device 203 may end a connection with the wireless audio output device 201 and output video data. The wearable display device 203 may receive video data from the electronic device 101 while performing operations 911 to 915. The wearable display device 203 may output video data received from the electronic device 101 even while releasing the connection with the wireless audio output device 201.

When the external device 205 is not connected, in operation 917, the wearable display device 203 may determine whether an indication relating to end of video data output is received. The wearable display device 203 may receive the indication relating to the ending of video data output from the electronic device 101. In an embodiment, when the electronic device 101 transmits the indication relating to the ending of video data output to the wearable display device 203, the electronic device 101 may instruct to end the connection with the wireless audio output device 201.

In operation 919, the wearable display device 203 may end the connection with the wireless audio output device 201. The wearable display device 203 may end output of video data and end the connection with the wireless audio output device 201.

According to various embodiments, the wearable display device 203 may detect periodically or in real time whether a user is wearing the wearable display device 203. The wearable display device 203 may notify the electronic device 101, periodically or in real time, of the wearing state of the user. If it is detected that a user is not wearing the wearable display device 203, the wearable display device 203 may not output video data. In an embodiment, if it is detected that a user is not wearing the wearable display device, the wearable display device 203 may transmit a request for switching connection with the wireless audio output device 203 to the electronic device 101. The wearable display device 203 may request switching connection with the wireless audio output device 101 from the electronic device 101 and end the connection with the wireless audio output device 201.

A method for operating an electronic device (e.g., the electronic device 101 of FIG. 1) according to various embodiments may include: monitoring a first device latency between a wireless audio output device (e.g., the wireless audio output device 201 of FIGS. 2A to 2C) and the electronic device, which are connected using a first communication scheme (e.g., the first communication scheme 210 of FIGS. 2A and 2B) through a communication module (e.g., the communication module 190 of FIG. 1) of the electronic device; predicting a second device latency in connection with the wireless audio output device via a wearable display device (e.g., the wearable display device 203 of FIGS. 2A to 2C) connected using a second communication scheme (e.g., the second communication scheme 230 of FIGS. 2A to 2C) through the communication module; and controlling connection of the wireless audio output device based on the first device latency and the second device latency.

The controlling of the connection of the wireless audio output device includes: maintaining the connection between the wireless audio output device and the electronic device when the first device latency is equal to or less than the second device latency; or controlling the wireless audio output device to be connected to the wearable display device when the first device latency exceeds the second device latency.

The first device latency includes at least one of a first latency between the electronic device and the wireless audio output device according to the first communication scheme and a second latency based on a buffer size of the wireless audio output device, wherein the second device latency includes at least one of a third latency between the electronic device and the wearable display device according to the second communication scheme, a fourth latency based on a buffer size of the wearable display device, a fifth latency between the wearable display device and the wireless audio output device, or a sixth latency based on a buffer size of the wireless audio output device.

The controlling of connection of the wireless audio output device includes controlling connection of the wireless audio output device based on a state of the electronic device or a type of the wireless audio output device in a first network environment in which the electronic device and the wireless audio output device are connected and the electronic device and the wearable display device are connected.

The controlling of the wireless audio output device may include controlling the wireless audio output device to be connected to the wearable display device when an external device is connected to the electronic device through the first communication scheme.

The controlling of the wireless audio output device may include: maintaining a connection between the wireless audio output device and the electronic device when the wireless audio output device has a fixed buffer size based on the type of the wireless audio output device; and controlling connection of the wireless audio output device based on the first device latency and the second device latency when the wireless audio output device has a variable buffer size based on the type of the wireless audio output device.

The controlling of the wireless audio output device may include: when there is no content output through the wearable display device in a second network environment in which the electronic device and the wearable display device are connected and the wearable display device and the wireless audio output device are connected, ending the connection between the wearable display device and the wireless audio output device, and controlling the wireless audio output device to be connected to the electronic device.

The controlling of the wireless audio output device may include: when an external device is connected to the wearable display device, ending the connection between the wearable display device and the wireless audio output device, and controlling the wireless audio output device to be connected to the electronic device.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a communication module;
a memory; and
a processor operatively coupled to the communication module and the memory,
wherein the processor is configured to:
monitor a first device latency between a wireless audio output device and the electronic device connected using a first communication scheme through the communication module;
predict a second device latency in connection with the wireless audio output device via a wearable display device connected using a second communication scheme through the communication module; and
control connection of the wireless audio output device based on the first device latency and the second device latency.

2. The electronic device of claim 1, wherein the processor is configured to:
maintain the connection between the wireless audio output device and the electronic device when the first device latency is equal to or less than the second device latency; and
control the wireless audio output device to be connected to the wearable display device when the first device latency exceeds the second device latency.

3. The electronic device of claim 1, wherein the first device latency comprises at least one of a first latency between the electronic device and the wireless audio output device according to the first communication scheme or a second latency based on a buffer size of the wireless audio output device.

4. The electronic device of claim 1, wherein the second device latency comprises at least one of a third latency between the electronic device and the wearable display device according to the second communication scheme, a fourth latency based on a buffer size of the wearable display device, a fifth latency between the wearable display device and the wireless audio output device, or a sixth latency based on a buffer size of the wireless audio output device.

5. The electronic device of claim 1, wherein the processor is configured to control connection of the wireless audio output device based on a state of the electronic device or a type of the wireless audio output device in a first network environment in which the electronic device and the wireless audio output device are connected and the electronic device and the wearable display device are connected.

6. The electronic device of claim 5, wherein the processor is configured to control the wireless audio output device to be connected to the wearable display device when an external device is connected to the electronic device through the first communication scheme.

7. The electronic device of claim 5, wherein the processor is configured to:
maintain connection between the wireless audio output device and the electronic device when the wireless audio output device has a fixed buffer size based on the type of the wireless audio output device; and
control connection of the wireless audio output device based on the first device latency and the second device latency when the wireless audio output device has a variable buffer size based on the type of the wireless audio output device.

8. The electronic device of claim 1, wherein the processor is configured to switch connection of the wireless audio output device based on at least one of whether or not content is output through the wearable display device, whether or not an external device is connected to the wearable display device, or a user's movement in a second network environment in which the electronic device and the wearable display device are connected and the wearable display device and the wireless audio output device are connected.

9. The electronic device of claim 8, wherein the processor is configured to, when there is no content output through the wearable display device, end the connection between the wearable display device and the wireless audio output device, and control the wireless audio output device to be connected to the electronic device.

10. The electronic device of claim 8, wherein the processor is configured to, when an external device is connected to the wearable display device, end the connection between the wearable display device and the wireless audio output device, and control the wireless audio output device to be connected to the electronic device.

11. The electronic device of claim 8, wherein the processor is configured to, when a distance between the wearable display device and the wireless audio output device is changed according to the user's movement, end the connection between the wearable display device and the wireless audio output device, and control the wireless audio output device to be connected to the electronic device.

12. A method for operating an electronic device, the method comprising:
monitoring a first device latency between the electronic device and a wireless audio output device connected using a first communication scheme through a communication module of the electronic device;
predicting a second device latency in connection with the wireless audio output device via a wearable display device connected using a second communication scheme through the communication module; and
controlling connection of the wireless audio output device based on the first device latency and the second device latency.

13. The method of claim 12, wherein the controlling of the connection of the wireless audio output device comprises:
maintaining the connection between the wireless audio output device and the electronic device when the first device latency is equal to or less than the second device latency; or
controlling the wireless audio output device to be connected to the wearable display device when the first device latency exceeds the second device latency.

14. The method of claim 12, wherein the first device latency comprises at least one of a first latency between the electronic device and the wireless audio output device according to the first communication scheme or a second latency based on a buffer size of the wireless audio output device, and wherein the second device latency comprises at least one of a third latency between the electronic device and the wearable display device according to the second communication scheme, a fourth latency based on a buffer size of the wearable display device, a fifth latency between the wearable display device and the wireless audio output device, or a sixth latency based on a buffer size of the wireless audio output device.

15. The method of claim 12, wherein the controlling of the connection of the wireless audio output device comprises controlling connection of the wireless audio output device based on a state of the electronic device or a type of the wireless audio output device in a first network environment in which the electronic device and the wireless audio output device are connected and the electronic device and the wearable display device are connected.

\* \* \* \* \*

UNITED STATES PATENT AND TRADEMARK OFFICE
CERTIFICATE OF CORRECTION

PATENT NO.        : 11,871,173 B2  
APPLICATION NO.   : 17/492402  
DATED             : January 9, 2024  
INVENTOR(S)       : Jo et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 239 days.

Signed and Sealed this  
First Day of July, 2025

Coke Morgan Stewart  
*Acting Director of the United States Patent and Trademark Office*